(12) United States Patent
Lee et al.

(10) Patent No.: US 7,014,313 B1
(45) Date of Patent: Mar. 21, 2006

(54) INTERCHANGEABLE SPECTACLES AND SUNSHADE CLIP ASSEMBLY

(76) Inventors: Suk-Jae Lee, #850, Chimsan 1-Dong, Buk-gu, Daegu (KR); Ju-Jae Lee, #101-701, Daewoo Royal Heights, 1190 Jiisan-Dong, Susung-Gu, Daegu (KR); Hyun-Jun Lee, #850, Chimsan 1-Dong, Buk-gu, Daegu (KR); Sung-Jun Lee, #101-701, Daewoo Royal Heights, 1190 Jiisan-Dong, Susung-Gu, Daegu (KR)

( * ) Notice: Subject to any disclaimer, the term of this patent is extended or adjusted under 35 U.S.C. 154(b) by 0 days.

(21) Appl. No.: 11/060,757

(22) Filed: Feb. 18, 2005

(51) Int. Cl.
   *G02C 9/00* (2006.01)
(52) U.S. Cl. .......................... 351/47; 351/57
(58) Field of Classification Search ................ 351/47, 351/48, 57, 58, 44, 41, 158
   See application file for complete search history.

(56) References Cited

U.S. PATENT DOCUMENTS 6,053,611 A * 4/2000 Ku ............................ 351/47
6,474,810 B1 * 11/2002 Ng ............................ 351/47
6,776,481 B1 * 8/2004 Ng ............................ 351/47
6,779,886 B1 * 8/2004 Huang ....................... 351/47

* cited by examiner

Primary Examiner—Hung Xuan Dang
(74) Attorney, Agent, or Firm—Mayer, Brown, Rowe & Maw LLP

(57) ABSTRACT

Disclosed herein is an interchangeable spectacles and sunshade clip assembly, comprising a spectacle frame, spectacles and a sunshade clip. The spectacle frame includes a frame bar integrally formed with or hingedly connected to a pair of temple arms so as to serve as a lens frame, a magnet piece extending rearward from the center of the frame bar, and one or more magnets incorporated in the magnet piece. The spectacles include a pair of lenses connected to each other via a bridge, and an approximately U-shaped insert centrally affixed at the bridge to correspond to the magnet piece and having upper and lower insert pieces. One or more magnets are incorporated in one of the upper and lower insert pieces. The sunshade clip includes a pair of sunshade lenses connected to each other via a sunshade bridge, and an approximately U-shaped coupling insert integrally injection molded with the sunshade bridge to correspond to the magnet piece and having upper and lower insert pieces.

4 Claims, 7 Drawing Sheets

INTERCHANGEABLE SPECTACLES AND SUNSHADE CLIP ASSEMBLY

BACKGROUND OF THE INVENTION

Field of the Invention

The present invention relates to an interchangeable spectacles and sunshade clip assembly, and more particularly, to an interchangeable spectacles and sunshade clip assembly in which spectacles, a spectacle frame and a sunshade clip are formed as separate elements and can be freely recombined, resulting in various different designs of the assembly depending on the wearer's taste.

SUMMARY OF THE INVENTION

It is an object of the present invention to provide an interchangeable spectacles and sunshade clip assembly which can meet customer's diversified demands for the design of the assembly through interchangeable combination of separate elements, such as spectacles, a spectacle frame and a sunshade clip.

It is another object of the present invention to provide an interchangeable spectacles and sunshade clip assembly in which a sunshade clip can be detachably attached to a spectacles/spectacle frame assembly by means of magnets so as to be selectively used to respond to a brightness change possibly caused while a wearer drives a car or enjoys outdoor sports, thereby being capable of eliminating the need for separate sunglasses and providing convenience in use.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred and alternative embodiments of the present invention in relation with an interchangeable spectacles and sunshade clip assembly will be described in detail with reference to the annexed drawings.

Figure 6:
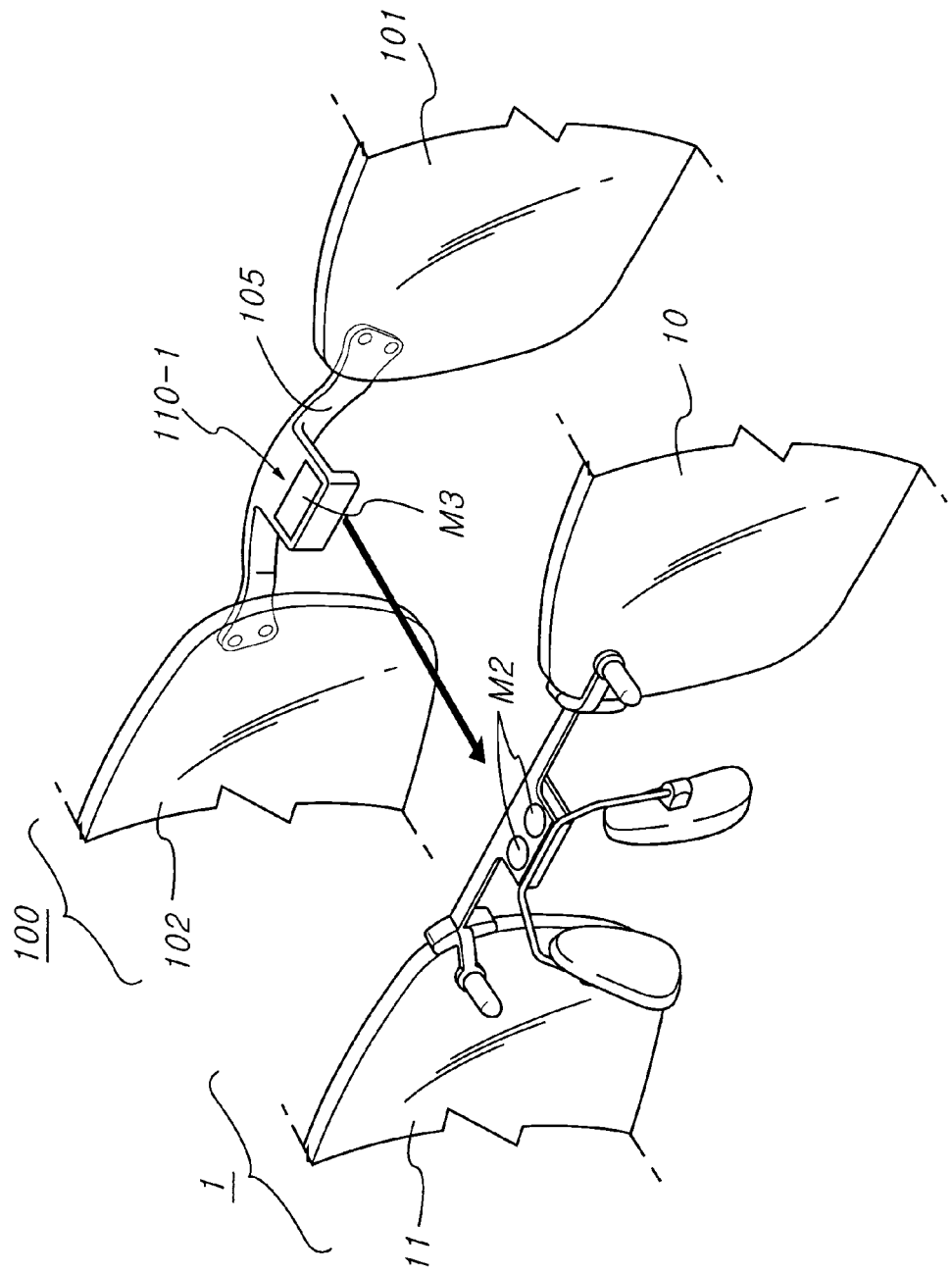
FIG. 6 is a partially cut-away rear perspective view illustrating an interchangeable spectacles and sunshade clip assembly in accordance with an alternative embodiment of the present invention.
Figure 7:
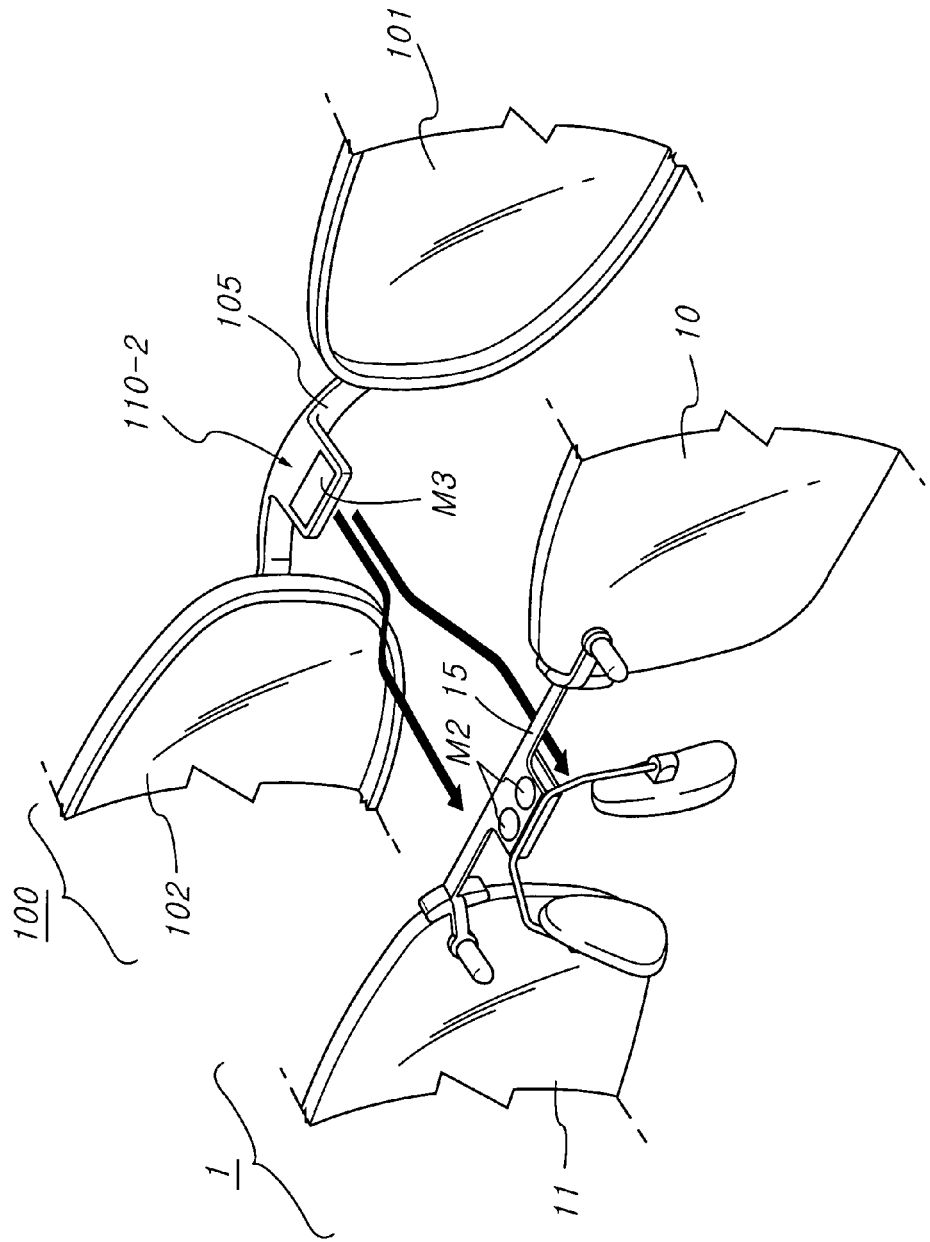
FIG. 7 is a partially cut-away rear perspective view illustrating an interchangeable spectacles and sunshade clip assembly in accordance with another alternative embodiment of the present invention.

FIGS. 1 to 5 illustrate an interchangeable spectacles and sunshade clip assembly in accordance with a preferred embodiment of the present invention, and FIGS. 6 and 7 illustrate different alternative embodiments of the present invention.

In the following description, since left and right sides of respective elements, namely, sunshade clip, spectacles and a spectacle frame, are symmetrical, only one side will be designated by reference numerals and explained, except for lens units thereof. Further, the constituent elements of alternative embodiments corresponding to those of a preferred embodiment of the present invention are designated by the same reference numerals.

The interchangeable spectacles and sunshade clip assembly of the present invention comprises spectacles 1, a spectacle frame 50 to be detachably attached to the spectacles 1 to form a spectacles/spectacle frame assembly, and a sunshade clip 100 to be detachably attached to the spectacles/spectacle frame assembly.

The spectacles 1, spectacle frame 50 and sunshade clip 100 are selectively attachable to one another by means of magnets, which are appropriately positioned such that opposite polarities face.

Figure 1:
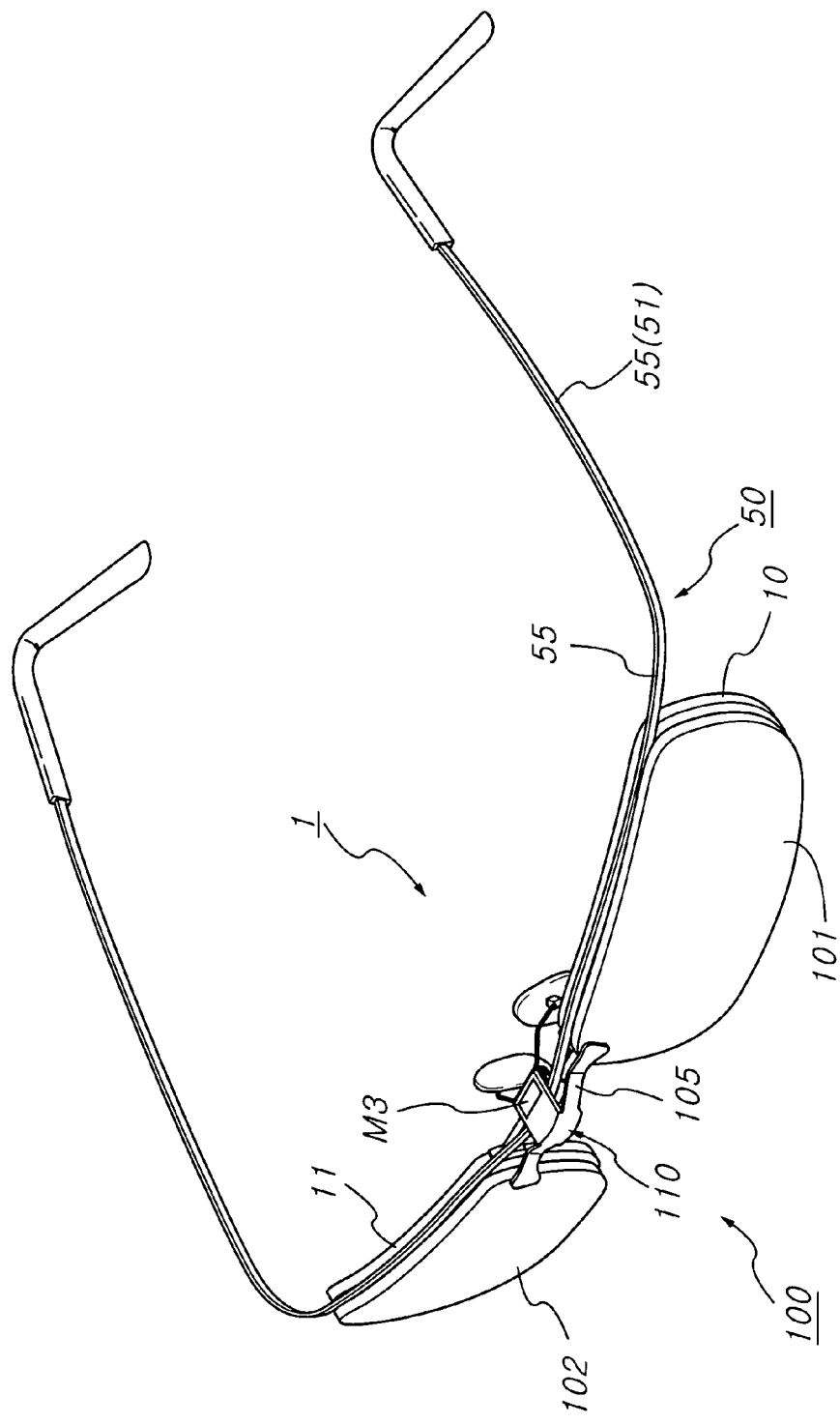
FIG. 1 is a perspective view illustrating an interchangeable spectacles and sunshade clip assembly in accordance with a preferred embodiment of the present invention.
Figure 2:
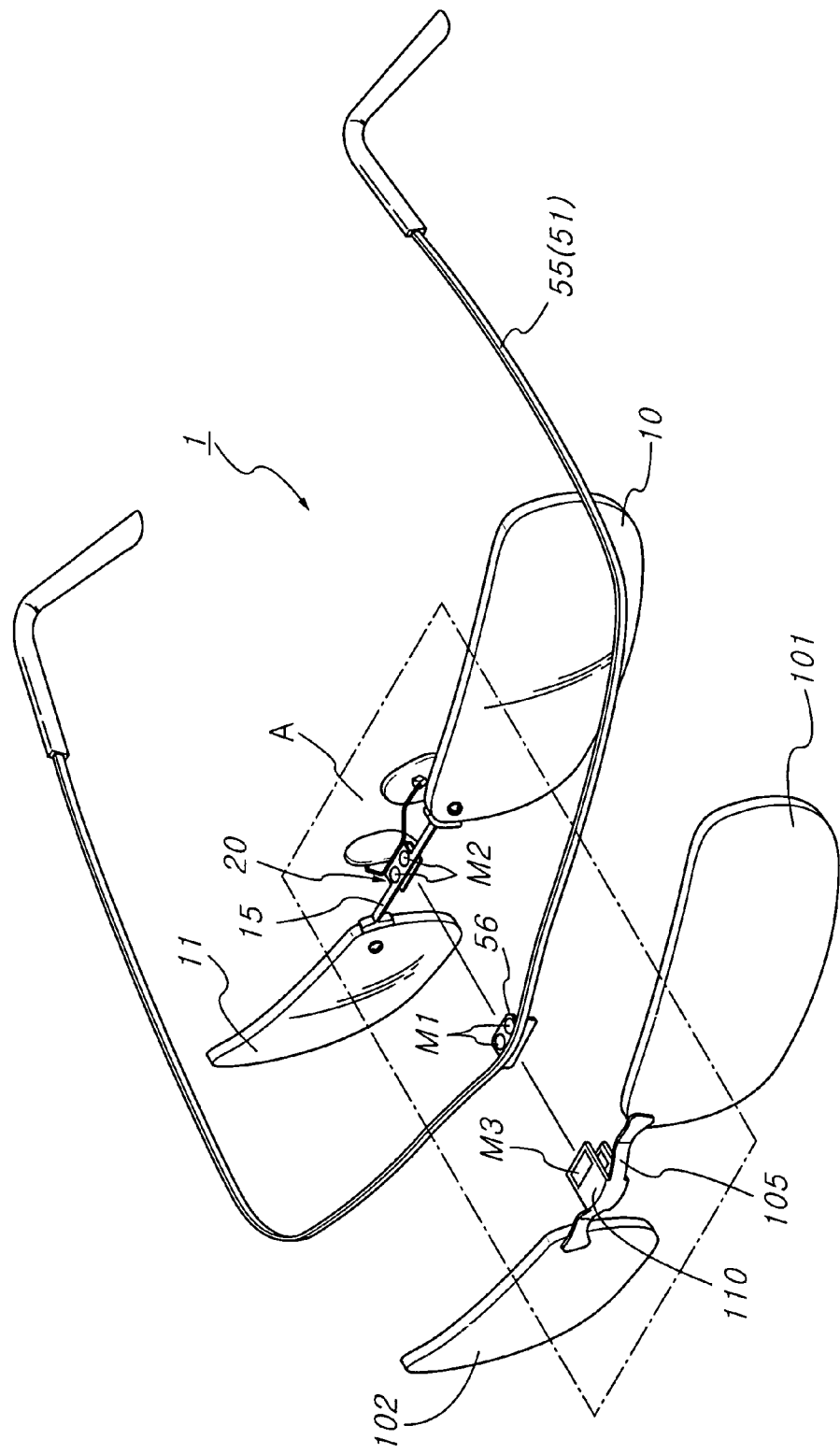
FIG. 2 is an exploded perspective view illustrating respective elements of the interchangeable spectacles and sunshade clip assembly shown in FIG. 1.
Figure 3:
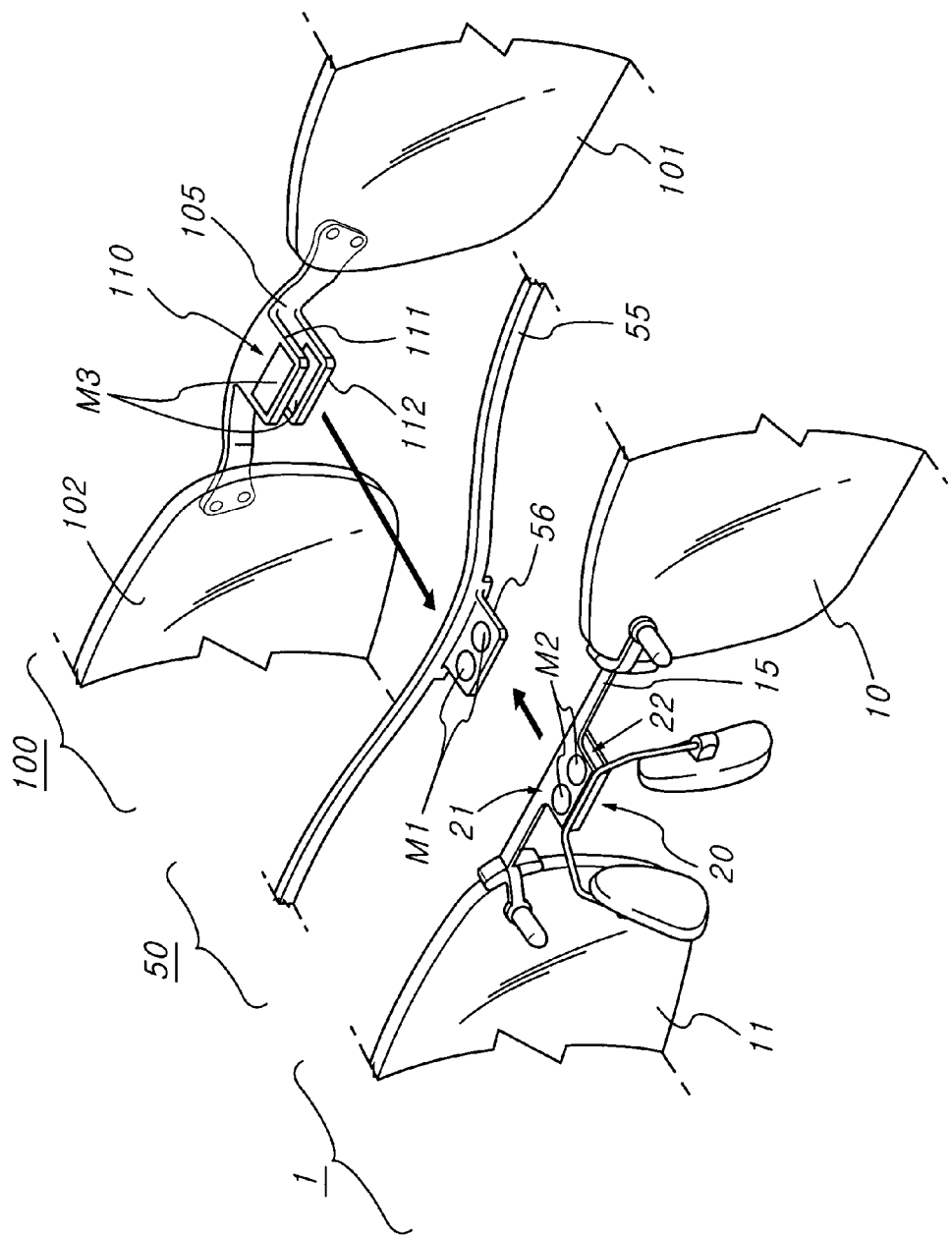
FIG. 3 is a partially cut-away rear perspective view illustrating the important portion A marked in FIG. 2.
Figure 4:
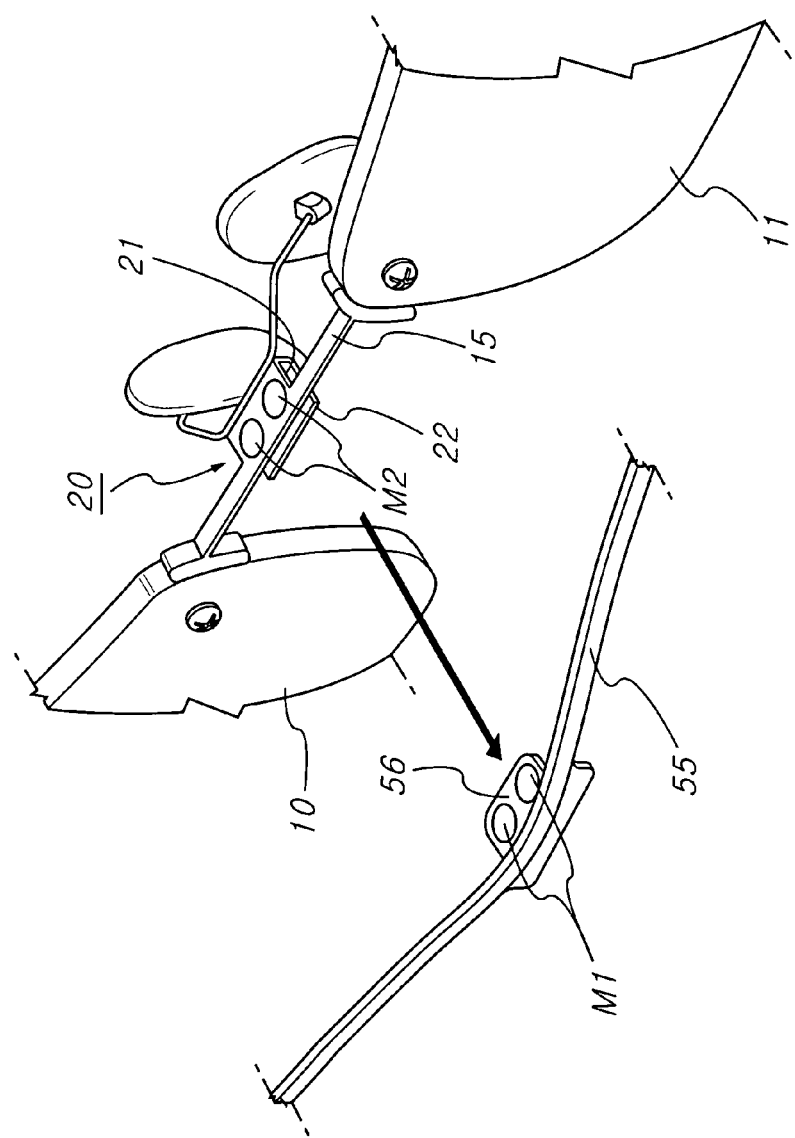
FIG. 4 is a partially cut-away perspective view explaining the coupling relationship of spectacles and a spectacle frame.
Figure 5:
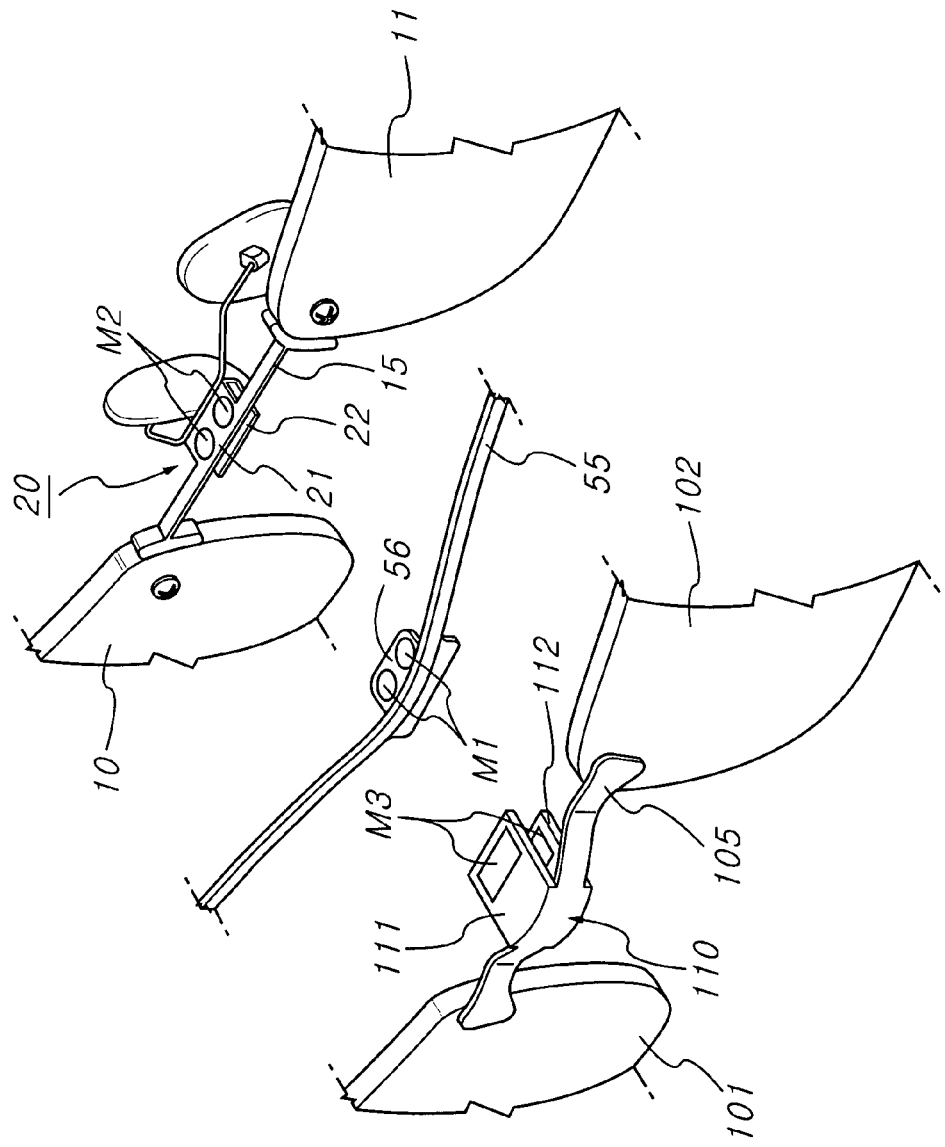
FIG. 5 is a partially cut-away perspective view illustrating the coupling relationship of the spectacles, the spectacle frame and a sunshade clip.

Referring to FIGS. 1 and 2, the spectacle frame 50, as a basic framework of the interchangeable spectacles and sunshade clip assembly according to the present invention, comprises a frame bar 55 integrally formed with a pair of temple arms 51 with no hinge. Here, the shape of the temple arms 51 is not limited only to that shown in the annexed drawings, but also includes various designs.

That is, the frame bar 55, integrally formed with or hingedly connected to the temple arms 51, takes the form of an upper rim portion of a conventional spectacles lens frame. Thereby, the frame bar 55 serves as a basic frame to which both the spectacles 1 and the sunshade clip 100 are detachably attached.

At the center of the frame bar 55 is integrally affixed a magnet piece 56 extending rearward, i.e. protruding toward the spectacles 1. The magnet piece 56 takes the form of a flat plate piece made of metal, and incorporates one or more highly-magnetic magnets M1. Alternatively, the magnet piece 56 itself is a magnetized element having the function of a magnet.

The spectacles 1, to be detachably attached to the spectacle frame 50, comprise a pair of lenses 10 and 11. In a preferred embodiment of the present invention, the lenses 10 and 11 have no lens frames and are connected to each other by means of a bridge 15. Here, the bridge 15 is bolted to the lenses 10 and 11.

At the center of the bridge 15 is affixed an approximately U-shaped insert 20 so as to correspond to the magnet piece 56 of the frame bar 55. The insert 20 consists of a pair of upper and lower insert pieces 21 and 22, and one or more magnets M2 are inserted into one of the insert pieces 21 and 22. Meanwhile, instead of the above described spectacles 1 having no lens frames, other spectacles, such as metal-rimmed spectacles, are also applicable to the present embodiment so as to achieve the same operational effects as the rimless spectacles 1.

With such a configuration as described above, the magnet piece 56 of the frame bar 55 is fitted into the insert 20 of the spectacles 1 and is fixedly attached thereto through attachment of the magnets M1 and M2.

Herein, in order to ensure more various combination of the spectacles and spectacle frame, there are provided a plurality of spectacles and spectacle frames having different shapes, enabling production of various designs of the spectacles/spectacle frame assembly.

To the spectacles/spectacle frame assembly is detachably attached the sunshade clip 100 to function as sunglasses.

In the preferred embodiment of the present invention, the sunshade clip 100 comprises a pair of sunshade lenses 101 and 102 having no lens frames, and an injection molded sunshade bridge 105 to connect the sunshade lenses 101 and 102 to each other. It will be recognized that the shape of the sunshade clip 100 is not limited only to the preferred embodiment, but also includes various designs, such as sunshade clips having sunshade lens frames.

At the center of the sunshade bridge 105 of the sunshade clip 100 is provided an approximately U-shaped coupling insert 110, which is integrally injection molded with the sunshade bridge 105. The coupling insert 110 is positioned to correspond to the magnet piece 56 of the frame bar 55 fitted in the insert 20 of the spectacles 1. The coupling insert 110 consists of a pair of upper and lower insert pieces 111 and 112, and a magnet M3 is inserted into a respective one of the insert pieces 111 and 112.

The upper and lower insert pieces 111 and 112 of the coupling insert 110 define a gap having a predetermined width T therebetween. The predetermined width T is determined to receive the insert 20 fitted with the magnet piece 56.

With such a configuration, the sunshade clip 100 is attached to or detached from the spectacles/spectacle frame assembly by means of the coupling insert 110 thereof, and can be selectively used as occasion demands.

As stated above, the interchangeable spectacles and sunshade clip assembly of the present invention is achieved by combining the spectacles 1, spectacle frame 50 and sunshade clip 100 freely selected from among a plurality of various different designs of spectacles, spectacle frames and sunshade clips depending on the wearer's taste. This means that the assembly of the present invention can be embodied into various designs.

FIG. 6 illustrates an alternative embodiment of the present invention. In the present embodiment, the sunshade clip 100 comprises a coupling insert 110-1, which has an approximately L-shaped form so that it is seated and attached onto an upper surface of the insert 20 of the spectacles 1. This allows the sunshade clip 100 to be more easily attached to or detached from the spectacles 1.

FIG. 7 illustrates another alternative embodiment of the present invention. Here, the sunshade clip 100 comprises a coupling insert 110-2, which has a planar protrusion form and incorporates the magnet M3. In this case, by making use of only a magnetic force of the magnet M3, the coupling insert 110-2 can achieve the same operational effects as the previous embodiments. As shown, the coupling insert 110-2 of the sunshade clip 110 is attachable to the spectacles 1 from above and below of the insert 20 of the spectacles 1. In the present embodiment, the sunshade clip 110 is configured to have sunshade lens frames.

In the above description, although it is explained that the magnet piece 56 of the spectacle frame 50, the insert 20 of the spectacles 1, and the coupling insert 110 of the sunshade clip 100 incorporate the plurality of magnets M1, M2 and M3, respectively, it is possible to achieve the same operational effects as the above described configuration even if one of the corresponding elements is made of a magnetically-induced material, and the other one is provided with the magnets, or one of the corresponding elements is magnetized to function as a magnet.

As apparent from the above description, the present invention provides an interchangeable spectacles and sunshade clip assembly in which spectacles and a sunshade clip, which are freely selectable from among various designs of spectacles and sunshade clips, are selectively attached to a spectacle frame as a basic framework, resulting in various designs of the assembly to meet the wearer's taste.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An interchangeable spectacles and sunshade clip assembly comprising:
   a spectacle frame including a frame bar integrally formed with or hingedly connected to a pair of temple arms so as to serve as a lens frame, a magnet piece extending rearward from the center of the frame bar, and one or more magnets incorporated in the magnet piece;
   spectacles including a pair of lenses connected to each other via a bridge, an approximately U-shaped insert centrally affixed at the bridge, the insert being positioned to correspond to the magnet piece affixed at the center of the frame bar and consisting of upper and lower insert pieces, and one or more magnets incorporated in one of the upper and lower insert pieces; and
   a sunshade clip including a pair of sunshade lenses connected to each other via a sunshade bridge, an approximately U-shaped coupling insert integrally injection molded with the sunshade bridge, the coupling insert being positioned to correspond to the magnet piece of the spectacle frame fitted in the insert of the spectacles and consisting of upper and lower insert pieces, and a magnet incorporated in a respective one of the insert pieces,
   whereby the spectacles, the spectacle frame and the sunshade clip are selectively combined with one another to achieve various different designs of the assembly.

2. The assembly as set forth in claim 1, wherein the magnet piece of the spectacle frame, the insert of the spectacles, and the coupling insert of the sunshade clip are magnetized, or made of a magnetically induced material, instead of incorporating the one or more magnets, respectively.

3. The assembly as set forth in claim 1, wherein the sunshade clip, instead of the approximately U-shaped coupling insert, includes a coupling insert having an approximately L-shaped form so as to be seated and attached onto an upper surface of the insert of the spectacles.

4. The assembly as set forth in claim 1, wherein the sunshade clip, instead of the approximately U-shaped coupling insert, includes a coupling insert having a planar protrusion form so as to be fixedly held on the spectacles by making use of only a magnetic force of a magnet incorporated therein.

\* \* \* \* \*